United States Patent [19]

Montez

[11] 4,284,027
[45] * Aug. 18, 1981

[54] BOAT WITH CANTED WING FINS

[76] Inventor: Delfino C. Montez, 24888 E. Rialto Ave., San Bernardino, Calif. 92408

[ * ] Notice: The portion of the term of this patent subsequent to Dec. 9, 1997, has been disclaimed.

[21] Appl. No.: 2,482

[22] Filed: Jan. 11, 1979

Related U.S. Application Data

[63] Continuation-in-part of Ser. No. 890,746, Mar. 27, 1978, Pat. No. 4,237,811.

[51] Int. Cl.³ .............................................. B63B 1/32
[52] U.S. Cl. ................................... 114/273 244/91
[58] Field of Search ................. 114/272, 273; 244/91, 244/48, 46, 45 R, 201; 296/15

[56] References Cited

U.S. PATENT DOCUMENTS

| | | | |
|---|---|---|---|
| 1,015,568 | 1/1912 | Langille | 114/273 |
| 1,041,489 | 10/1912 | Lake | 114/272 |
| 1,776,316 | 9/1930 | Horeth | 244/48 |
| 1,846,336 | 2/1932 | Icre | 114/273 |
| 1,853,125 | 4/1932 | Hitt | 114/272 |
| 1,889,927 | 12/1932 | MacCallum | 114/273 |
| 3,135,482 | 6/1964 | Girard | 244/48 X |
| 3,390,655 | 7/1968 | Quady et al. | 114/1 |
| 3,648,640 | 3/1972 | Granger | 114/273 |
| 3,768,429 | 10/1973 | Greer | 114/274 |
| 4,050,397 | 9/1977 | Vanderleest | 244/91 |
| 4,082,341 | 4/1978 | Gore | 296/15 |
| 4,135,687 | 1/1979 | Jones, Jr. | 244/91 |
| 4,190,219 | 2/1980 | Hackett | 244/91 |

*Primary Examiner*—Sherman D. Basinger
*Attorney, Agent, or Firm*—Nilsson, Robbins, Dalgarn, Berliner, Carson & Wurst

[57] ABSTRACT

A boat having an airfoil, providing aerodynamic lift, attached to the aft portion of the boat stabilized with canted vertical stabilization fins, an airfoil, providing and having aerodynamic lift, attached to the forward portion of the boat. Specifically, a boat is disclosed having an elongated air foil, pivotally attached to the forward portion of the boat and a stacked pair of elongated airfoils pivotally attached to the aft portion of the boat. The angle of attack of each of the airfoils can be independently adjusted. In addition, the aft pair of stacked airfoils as an assembly can be raised, lowered, and adjusted with respect to its angle of attack. Vertical stabilization fins are provided for the ends of the aft airfoils and the ends of the forward airfoils. The aft stabilization fins are canted to provide lateral stability and to concentrate forces acting on the boat to the middle of the boat. All of the airfoils are removably attached to the boat so that the boat can be readily configured with or without them.

19 Claims, 6 Drawing Figures

U.S. Patent  Aug. 18, 1981  4,284,027
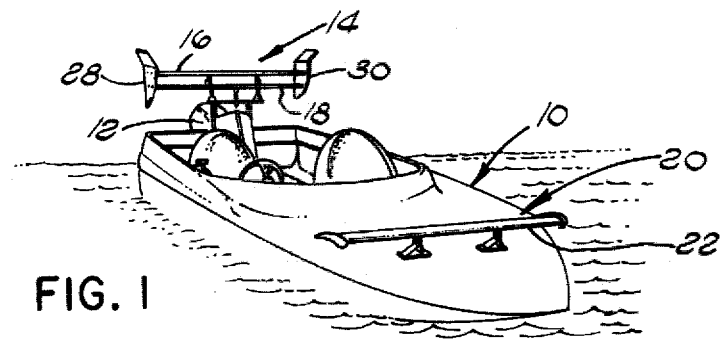
FIG. 1
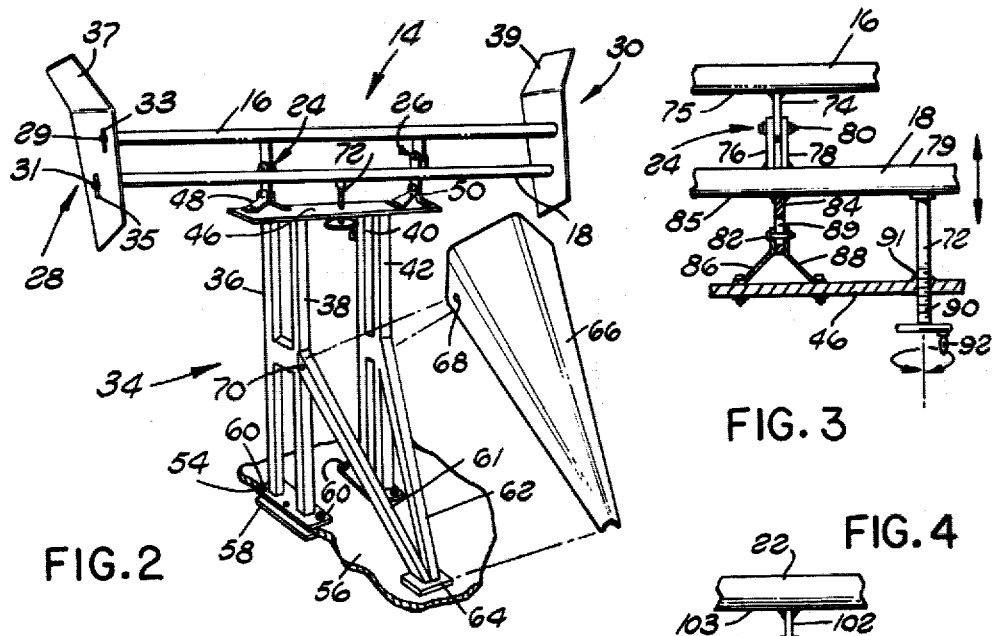
FIG. 2
FIG. 3
FIG. 4
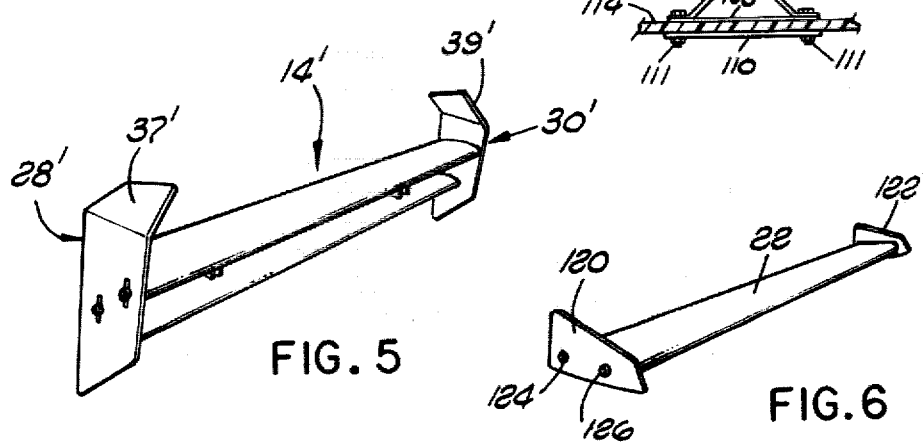
FIG. 5
FIG. 6

4,284,027

BOAT WITH CANTED WING FINS

CROSS REFERENCE TO RELATED APPLICATION

This application is a continuation-in-part of application Ser. No. 890,746, filed Mar. 27, 1978 now U.S. Pat. No. 4,237,811.

FIELD OF THE INVENTION

This invention relates to relatively small inboard or outboard boats incorporating aerodynamic lift means to increase speed and improve fuel economy.

BACKGROUND AND SUMMARY OF THE INVENTION

An ongoing objective in watercraft hull design has been to minimize water-induced drag on the hull as it is propelled through the water, thereby effecting faster speeds and less fuel consumption. Three types of watercraft have been traditionally utilized with varying degrees of success to achieve the above objectives, the three types being displacement crafts, hydrofoil craft and planing craft. The displacement craft forms a wave at the bow of the boat which, at slow speeds has a single crest. As the speed of the craft increases, a second crest is formed which moves rearwardly, ultimately causing the craft to sink when a certain maximum speed is reached. The planing watercraft does not have this disadvantage because its hull is designed so that as the speed of the craft increases, it is lifted to and planes across the surface of the water. However, a great amount of power is required to bring the craft to planing speed, and relatively small waves at the water surface tend to capsize the craft. Thus planing vessels are dangerous to operate and primarily limited to racing events. The hyrofoil craft utilizes hydrofoils which are attached to the sides of the vessel and extend downwardly into the water below the lowermost portion of the hull of the craft. As the hydrofoil craft initially moves forward, the hull acts as that of a displacement craft. However, as its speed increases, the hydrofoils tend to lift the craft so that the hull no longer contacts the water, thereby resulting in the reduced water drag experienced by the planing craft. Hydrofoil craft exhibit considerably more stability than planing craft. All of the above watercraft have some disadvantages. The displacement craft is limited to relatively low speeds and has a maximum speed beyond which it will capsize. The planing craft can achieve high speeds, but is dangerous to operate. The hydrofoil craft, although overcoming some of the disadvantages of the displacement and planing craft, requires a specialized hull which is expensive to produce and is somewhat limited to use in larger craft.

The present invention discloses aerodynamic lift means which can be attached to either an inboard or outboard displacement type boat, preferably a water ski boat, thereby increasing its speed without the danger associated with a planing craft. The lift means acts through both the front portion and rear portion of the boat, thereby raising both the front and rear portions as the boat is propelled through the water. Such an arrangement has been disclosed and claimed in my copending application Ser. No. 890,746, filed Mar. 27, 1978, entitled "Winged Ski Boat". In the present embodiment, the lift means acting on the rear portion of the boat includes vertical stabilization fins, each having a portion canted to an angle of at least 30°, preferably in the range of 30°–40° from vertical. The canted fins serve to provide lateral stability and to concentrate forces acting on the boat to the middle of the boat. By raising both portions of the boat in this manner, some of the disadvantages of displacement type craft are overcome since the amount of hull surface area in contact with the water is reduced while at the same time the boat is stabilized. This is effected without the large power requirements and inherent danger associated with a planing craft or the unique hull design required by a hydrofoil craft.

In a specific embodiment, an outboard water ski boat is configured with a wing removably attached to the front portion of the boat and a pair of stacked wings removably attached to the rear portion of the boat. The angle of attack of each wing can be independently adjusted, thereby providing a lift adjustment means. Vertical stabilization fins are provided for the ends of the aft wings and can be provided for the ends of the front wings, the fins providing increased lateral stability for the boat. As above described, the rear vertical fins are each formed with a portion canted, inwardly or outwardly, to at least 30°, preferably in the range of 30°–40° from vertical, exemplified in the Figures by 35°. A ski boat configured according to the invention has a smoother ride in that the boat rides higher on the water surface as it is propelled forward, yet remains stable. This additional height, and associated drag reduction, allows the ski boat to go faster with a given power source. In a specific model utilizing an 18 foot boat, the speed was increased from 60 m.p.h. without the lift producing wings to between 75 m.p.h. and 80 m.p.h. with the lift producing wings. Less fuel is used to maintain a predetermined speed because there is less drag created between the water and the hull surface extending into the water. Another advantage of the invention is that it allows a larger propeller to be used in conjunction with a given propulsion means because the rear portion of the boat is higher in the water than it would be without the wings, thereby lifting a portion of the propeller out of the water and reducing propeller drag.

BRIEF DESCRIPTION OF THE DRAWINGS

FIG. 1 is a perspective view of a water ski boat configured to an embodiment of the present invention;

FIG. 2 is a perspective view of the aft wing assembly of the boat of FIG. 1;

FIG. 3 is an elevational view showing one of the aft wing mounting brackets and the height adjuster;

FIG. 4 is an elevational view of one of the forward wing mounting brackets;

FIG. 5 is a perspective view of another set of aft wings showing another embodiment of the aft stabilization fins; and FIG. 6 is a perspective view of the forward wings showing another embodiment of the forward stabilization fins.

DETAILED DESCRIPTION

As required, detailed illustrative embodiments of the invention are disclosed herein. The embodiments exemplify the invention and are currently considered to be the best embodiments for such purposes and the specific embodiment disclosed is representative in providing a basis for the claims which define the scope of the present invention.

As above indicated, the invention discloses a boat, exemplified by a water ski boat, having a lift means attached to the front portion thereof and a lift means attached to the aft portion thereof. As the boat is propelled through the water, the forward and aft lift means raises both the forward and aft portions of the boat out of the water somewhat, thereby reducing the drag of the water on the boat and providing both a faster and smoother ride.

Referring to FIG. 1, a water ski boat 10 is shown to which is attached an outboard motor 12, an aft wing assembly 14, having an upper wing 16, a lower wing 18 and canted vertical stabilization fins 28 and 30, and a forward wing assembly 20 having a single wing 22. As will be explained below, the two aft wings 16 and 18 and forward wing 22 are mounted so that the angle of attack of each with respect to the other two can be independently adjusted. In addition, the height of the two aft wings 16 and 18 with respect to the outboard motor 12 can be also adjusted. Both wing assemblies 14 and 20 are removably attached to the boat 10, and the three wings 16, 18, and 22 are removably attached to their respective wing assemblies 14 and 20.

As shown in FIG. 2, the aft wing assembly 14 comprises the upper wing 16, the lower wing 18, both of which are rotatably attached to each other by a left swivel connection 24 and a right swivel connection 26, thereby allowing the angle of attack of the upper wing 16 to be adjusted with respect to that of the lower wing 18. Having adjusted the angle of attack, the two wings 16 and 18 are held in fixed relationship to each other by two vertically oriented stabilization fins 28 and 30.

The left aft vertical stabilization fin 28 is attached to the left tips of both the aft upper wing 16 and the aft lower wing 18 by two bolt, washer and nut combinations 29 and 31. An upper adjustment slot 33 and lower adjustment slot 35 are provided in the stabilization fin 28 so that the angle of attack of each aft wing 16 and 18 can be adjusted. In a similar manner, the right aft vertical stabilization fin 30 is attached to the right wing tips.

In accordance with a specific embodiment, each of the vertical stabilization fins 28 and 30 is canted at its upper end 37 and 39, respectively. Specifically, a portion of the fin, at least as long as one-half the width of the wing, but usually substantially longer, is angled inwardly or outwardly to at least 30° and as high as 40° from vertical. FIGS. 1 and 2 illustrate aft wings with outwardly canted fins whereas FIG. 5 illustrates aft wings with inwardly canted fins. While it is preferred to cant the upper portion of the fins, one could alternatively cant the lower portion of each fin. In the embodiments exemplified, the fins are canted about 35°. Canting can occur immediately adjacent the wing or, as illustrated, can start at a region spaced from the wing. Besides their stabilization and force concentration functions, by connecting the fins as above, they also partially maintain the angle of attack relationship between the two wings 16 and 18, and they prevent flapping of the wings 16 and 18 as the speed of the onrushing air increases.

The aft wing assembly further comprises a holding platform 34 for the two wings 16 and 18. The platform 34 consists of four upright legs 36, 38, 40 and 42, the upper ends of which support a mounting plate 46 to which is attached a left wing-support bracket 48 and a right wing-support bracket 50. The left-side upright legs 36 and 38 are attached to a first plate 54 which rests on the floor 56 of the ski boat 10. Positioned directly below the first plate 54 and on the opposite side of the floor 56 is a second plate 58. The first plate 54 is secured to the second plate 58, and thus to the floor 56, by an appropriate number of bolts 60 extending therethrough. It is highly desirable that this first and second plate attachment method be utilized because the horizontal forces of the passing air against the upper and lower wings 16 and 18 in conjunction with the distance between the wings 16 and 18 and the boat floor 56 results in a considerable twisting moment being applied at the boat floor 56, thereby necessitating a substantial means for attachment. The right-side upright legs 40 and 42 are attached to the boat floor 56 in the same manner as that previously described for the left-side upright legs 36 and 38. Additional support is provided by two elongated support bars 61 and 62 which extend from the middle of the left-side forward upright leg 38 and the right-side forward upright leg 42 to a common mounting plate 64 located between and forward of the first and second plates 54 and 58. In a similar manner to the left-side upright legs 36 and 38, the common mounting plate 64 is positioned over a second mounting plate (not shown) below the floor 56 and attached in a similar manner as that of the first and second plates 54 and 58 as previously explained. A wind-deflecting shield 66 completes the aft wing assembly 14 and is attached to the two support bars 61 and 62 at their upper ends adjacent to the forward upright legs 38 and 42 by two bolts (not shown) extending through corresponding holes 68 and 70. The pressure of the wind on the shield 66 is sufficient to hold the bottom portion against the common mounting plate 64. The height of the upper wing 16 and the lower wing 18 with respect to their mounting plate 46 can be readily adjusted by a rotatably mounted adjusting rod 72 to be explained in more detail below.

Details of the positioning of the upper wing 16 with respect to the lower wing 20 and the positioning of both wings with respect to the mounting plate 46 can be seen in FIG. 3. The left swivel connection 24 consists of a strut 74 extending downwardly from the bottom surface 75 of the upper wing 16. This strut 74 is positioned between two struts 76 and 78 which extend upwardly from the upper surface 79 of the lower wing 18. A holding nut and bolt combination 80 is contained within a bore formed by holes in overlapping portions of the downwardly extending strut 74 and the upwardly extending struts 76 and 78. The right swivel connection 26 is formed in a manner identical to the above described left swivel connection 24. Thus one can appreciate that by loosening the nut and bolt combination 80 on both the left and right swivel connections 24 and 25, the upper wing 16 can be rotatably positioned with respect to the lower wing 18, and that position maintained by tightening the two nut and bolt 80 combinations.

Having adjusted the angle of the upper wing 16 with respect to the lower wing 18 as above described, the angle of the thus adjusted upper and lower wing combination can be adjusted with respect to the mounting plate 46 by a second nut and bolt combination 82 which is inserted between a strut 84 which extends downwardly from the lower surface 85 of the lower wing 18 and is positioned between two holding brackets 86 and 88 secured to the mounting plate 46. The lower end of the downwardly extending strut 84 forms an elongated slot 89 which allows the lower wing 18, and thus the upper wing 16, to be vertically positioned with respect to the mounting plate 46, the positioning range being determined by the length of the elongated slot 89. A downwardly extending strut, nut, bolt and brackets identical to those just described (82, 84, 86 and 88) are also provided on the right side of the mounting plate 46. A lower portion 90 of the adjusting rod 72 is threaded, the threads being in interlocking contact with a threaded hole 91 in the mounting plate 46. A handle 92 is attached to the lower end of the adjusting rod 72, the rotation of which exerts pressure on the bottom surface 85 of the lower wing 18 thereby raising or lowering the upper and lower wing 16 and 18 combination.

The forward wing assembly 20 comprises the forward wing 22 and right and left wing mounts 98 and 100 respectively. Referring to FIG. 4, the wing 22 has a left strut 102 extending downwardly from its lower surface 103, the strut interfacing with the left wing mount 100. The left wing mount 100 comprises two angled brackets 104 and 106, an upper support plate 108, a lower support plate 110 and an appropriate number of nuts and bolts 111. The left strut 102 is positioned between the upper ends of the angle brackets 104 and 106 and secured by a nut and bolt 112. The lower ends of the angled brackets 104 and 106 are secured to the upper and lower support plates 108 and 110 respectively by the nuts and bolts 111, the plates being positioned on opposite sides of the forward hull portion 114. The right wing mount is identical to the left wing mount 100, the mount interfacing with a downwardly extending right strut (not shown) which corresponds to the downwardly extending left strut 102. As one can appreciate, loosening the nut and bolt 112 enables the wing 22 to be rotated with respect to its longitudinal axis, thereby changing its angle of attack.

Referring to FIG. 5, in a second embodiment of the invention, an aft wing assembly 14' is provided in which the vertically oriented stabilization fins 28' and 30' are canted so that the upper portions 37' and 39' are offset at an angle of 35°, inwardly of vertical. All other construction is the same as depicted in FIG. 2.

Referring to FIG. 6, a left forward vertical stabilization fin 120 and right forward vertical stabilization fin 122 can also be attached to the left and right forward tips of the wing 22 thereby providing additional lateral stability to the forward wing assembly 20. Each fin 120 and 122 is secured to its corresponding wing tip by two bolts 124 and 126.

All of the vertical stabilization fins 28, 30, 28', 30', 120 and 122 can be formed of sheet aluminum. One can also appreciate that single or multiple vertical stabilization fins could be incorporated in both the forward and aft wings to provide lateral stability, for example a centrally disposed fin in lieu of the embodiment above-described. In such case, with regard to the aft wings, or both aft and forward, the fins would preferably have a branched top with canted portions on each side.

In operation, the aft wings 16 and 18 are attached to their support brackets 48 and 50 and the forward wing is attached to its mounting brackets 98 and 100. The angles of attack of the three wings are adjusted in accordance with the anticipated speed of the boat, the size of the motor, and the amount of lift desired. The height of the two aft wings 16 and 18 is adjusted in accordance with air flow interference either by people or equipment in the boat or by the size of the outboard motor.

Although the wings as shown are in the shape of an airfoil having an upper surface area greater than the lower surface area, thereby producing lift due to a reduced pressure on the upper surface, it is believed that this lift-producing characteristic of an airfoil is not the primary lift-producing element of the invention. It is believed the angle of the lower surfaces of the three wings with respect to the passing air provides most of the lift. Consequently, it is important that the two aft wings 16 and 18 and the forward wing 22 be angled with respect to the passing airstream so that a portion thereof is deflected downwardly, thereby providing an upward lift component to the boat through the above described holding structures.

As one can appreciate, the principles of the invention can be practiced with a variety of structures. For example, an inboard boat could be utilized just as effectively as the outboard boat shown in FIG. 1, and the aft wing assembly could comprise a longer single wing or stacked wings consisting of more than two wings. In addition, the forward wing assembly could also comprise stacked wings consisting of more than two wings. However, it has been found that to realize the advantage of the invention, lift must be provided at both the forward and aft ends of the boat, otherwise the lifting action of aft wings only would push the forward portion of the boat deeper into the water or the lifting action of the forward wing only would push the aft portion of the boat deeper into the water, thereby increasing the possibilities for swamping.

I claim:

1. In a surface boat having a hull with an open passenger compartment between front and rear portions and power means having a water reactive means located aft of said passenger compartment for driving said boat forward, the improvement comprising:
   first aerodynamic lift means;
   means for removably securing said first aerodynamic lift means to the top of, and directly over, said hull at a region forward of said passenger compartment so that said lift means is spaced above and limited to said forward region;
   second aerodynamic lift means spaced above and removably attached to the rear of said hull, said first and second aerodynamic lift means each having at least one aerodynamic lift member, said aerodynamic lift member of said first lift means being substantially closer to the hull than any aerodynamic lift member of said second lift means, said first and second lift means being arranged to exert an upward force on said hull as said power means drives said boat forward, said second lift means providing substantially more lift than said first lift means;
   a substantial portion of said passenger compartment being clear of any aerodynamic lift means; said aerodynamic lift member of said second lift means comprising a first elongated wing; and
   lateral stabilization means comprising at least one stabilization fin attached to said wing and vertically directed therefrom, said fin having a portion canted with respect to said vertical direction.

2. The boat of claim 1 in which said fin portion is canted to an angle of at least 30° from vertical.

3. The boat of claim 1 in which said fin portion is canted to an angle in the range of about 30°–40° from vertical.

4. The boat of claim 1 in which said stabilization means comprises at least two stabilization fins, one on each side of said wing, said fin portions being canted inwardly.

5. The boat of claim 1 in which said stabilization means comprises at least two stabilization fins, one on each side of said wing, said fin portion being canted outwardly.

6. The boat of claim 5 in which said first elongated wing comprises an upper elongated wing and including a lower elongated wing, said wings being substantially vertically stacked and spaced apart a predetermined distance, said fins being attached to respected ends of both said wings.

7. The boat of claim 6 further including means for independently changing the angle of attack of said upper wing and the angle of attack of said lower wing.

8. The boat of claim 6 further including means for raising and lowering said upper and lower wings without altering said predetermined distance.

9. The boat of claim 1 in which said fin portion is an upper portion.

10. The boat of claim 1 further including means for changing the angle of attack of said elongated wing.

11. The boat of claim 1 in which said second lift means comprises a support structure attached at the rear portion of said hull, said elongated wing being attached to said support structure.

12. The boat of claim 11 further including a wind-deflectng cover for said support structure.

13. The boat of claim 1 as a water ski boat.

14. The improvement of claim 1 in which said second aerodynamic lift means comprises an upper elongated wing and a lower elongated wing removably attached to said hull, said wings being substantially vertically stacked and spaced apart a predetermined distance;

said lateral stabilization means, including said at least one stabilization fin, comprising a left vertical stabilization fin attached to the left end of said upper and lower elongated wings and vertically directed therefrom, and a right vertical stabilization fin attached to the right side of said upper and lower elongated wings and vertically directed therefrom; an upper portion of each said fin being canted to an angle in the range of 30°–40° with respect to said vertical direction.

15. The boat of claim 14 in which said fins are canted outwardly.

16. The boat of claim 14 in which said fins are canted inwardly.

17. The boat of claim 14 further including means for independently changing the angle of attack of said upper wing and the angle of attack of said lower wing.

18. The boat of claim 17 further including means for raising and lowering said upper and lower wings without altering said predetermined distance.

19. The boat of claim 14 as a water ski boat.

* * * * *